(12) United States Patent
Bonhote et al.

(10) Patent No.: US 8,432,637 B2
(45) Date of Patent: Apr. 30, 2013

(54) WET ETCHING SILICON OXIDE DURING THE FORMATION OF A DAMASCENE POLE AND ADJACENT STRUCTURE

(75) Inventors: Christian R. Bonhote, San Jose, CA (US); Kanaiyalal C. Patel, Fremont, CA (US)

(73) Assignee: HGST Netherlands B.V., Amsterdam (NL)

( * ) Notice: Subject to any disclaimer, the term of this patent is extended or adjusted under 35 U.S.C. 154(b) by 155 days.

(21) Appl. No.: 12/943,880

(22) Filed: Nov. 10, 2010

(65) Prior Publication Data

US 2012/0113544 A1 May 10, 2012

(51) Int. Cl.
*G11B 5/127* (2006.01)

(52) U.S. Cl.
USPC .................................................. 360/125.09

(58) Field of Classification Search ............. 360/119.04, 360/125.06, 125.07, 125.08, 125.09, 125.1, 360/125.11, 125.12, 125.13, 125.25, 125.38
See application file for complete search history.

(56) References Cited

U.S. PATENT DOCUMENTS

| | | | |
|---|---|---|---|
| 4,195,323 A | 3/1980 | Lee | |
| 4,481,071 A | 11/1984 | Anderson et al. | |
| 6,018,862 A | 2/2000 | Stageberg et al. | |
| 6,826,011 B1 | 11/2004 | Haftek | |
| 7,193,814 B2 | 3/2007 | Han et al. | |
| 7,239,478 B1 | 7/2007 | Sin et al. | |
| 7,248,431 B1 | 7/2007 | Liu et al. | |
| 7,251,102 B2 | 7/2007 | Han et al. | |
| 7,444,740 B1 | 11/2008 | Chung et al. | |
| 7,603,764 B2 | 10/2009 | Sasaki | |
| 7,788,798 B2 * | 9/2010 | Guthrie et al. | 29/603.16 |
| 7,920,358 B2 * | 4/2011 | Jiang et al. | 360/125.17 |
| 7,995,307 B2 * | 8/2011 | Zheng | 360/125.13 |
| 8,015,692 B1 * | 9/2011 | Zhang et al. | 29/603.14 |
| 8,018,677 B1 * | 9/2011 | Chung et al. | 360/125.03 |
| 8,018,679 B2 * | 9/2011 | Hsiao et al. | 360/125.07 |
| 8,049,989 B2 * | 11/2011 | Jiang et al. | 360/125.09 |
| 8,120,874 B2 * | 2/2012 | Hsiao et al. | 360/119.04 |
| 8,137,570 B2 * | 3/2012 | Le | 216/22 |
| 8,166,632 B1 * | 5/2012 | Zhang et al. | 29/603.16 |

(Continued)

FOREIGN PATENT DOCUMENTS

JP 2009009632 * 1/2009

OTHER PUBLICATIONS

Okada, T et al., "Fabrication process for a trapezoidal main pole for single-pole-type heads," © IEEE 2010, IEEE Transactions on Magnetics, vol. 38, Issue 5, Sep. 2002, pp. 2249-2252, abstract only.

*Primary Examiner* — Angel A. Castro
(74) *Attorney, Agent, or Firm* — Zilka-Kotab, PC (57) ABSTRACT

A magnetic head according to one embodiment includes a side gap layer comprising primarily silicon nitride, wherein outer sides of the side gap layer taper away from one another from a leading end of the side gap layer towards a trailing end of the side gap layer; a seed layer above the silicon nitride side gap layer; and a magnetic pole on the seed layer. A method for forming a magnetic head according to one embodiment includes etching a channel in a silicon oxide layer; forming a side gap layer comprising primarily silicon nitride in the channel; forming a seed layer above the side gap layer; plating a pole on the seed layer; and removing the silicon oxide layer by wet etching. Additional systems and methods are also presented.

19 Claims, 8 Drawing Sheets

U.S. PATENT DOCUMENTS

| | | | |
|---|---|---|---|
| 8,201,320 B2* | 6/2012 | Allen et al. | 29/603.16 |
| 8,259,413 B2* | 9/2012 | Bonhote et al. | 360/125.6 |
| 2005/0057852 A1* | 3/2005 | Yazawa et al. | 360/125 |
| 2006/0000795 A1 | 1/2006 | Chen et al. | |
| 2006/0044682 A1* | 3/2006 | Le et al. | 360/126 |
| 2009/0002885 A1* | 1/2009 | Sin | 360/125.02 |
| 2009/0011280 A1 | 1/2009 | Inukai | |
| 2009/0117407 A1 | 5/2009 | Zheng et al. | |
| 2010/0020431 A1 | 1/2010 | Shimazawa et al. | |

* cited by examiner

WET ETCHING SILICON OXIDE DURING THE FORMATION OF A DAMASCENE POLE AND ADJACENT STRUCTURE

FIELD OF THE INVENTION

The present invention relates to data storage systems, and more particularly, this invention relates to a magnetic recording heads for writing to magnetic recording medium.

BACKGROUND

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing, the write and read heads are employed for writing magnetic impressions to and reading magnetic signal fields from the rotating disk. The read and write heads are connected to processing circuitry that operates according to a computer program to implement the writing and reading functions.

In typical systems, a main pole of a magnetic head senses information stored on the magnetic disk. In some instances, a damascene process may be used to produce the main pole in the magnetic head. The damascene main pole process requires the formation of a trench by dry etch, e.g., reactive ion etching (RIE), into a dielectric material, e.g., alumina, silicon dioxide, etc., followed by deposition of a dielectric side gap and a conductive seed layer that are both incorporated into the side gap. In order to include a wrap around shield structure in the magnetic head, the dielectric material which is all around the now-filled trench is removed. Alumina can be wet etched easily and isotropically, but when the trench comprises of silicon dioxide, a dry etch containing fluorine compounds is traditionally used, but this etch is not very isotropic and some residual silicon dioxide may be left behind near the bottom of the main pole, especially in the corner formed where the structure meets the underlying etch stop layer. This residual material changes the head geometry and therefore adversely impacts the performance of the magnetic head.

Therefore, there is a need in the art of magnetic head production for a way to remove the silicon dioxide matrix surrounding the newly-formed magnetic pole by wet etch without etching away the side gap. Some attempts have been made to provide this solution, such as using a solution having HF (hydrofluoric acid), but these solutions also etch the main pole material, such as when the main pole comprises a CoNiFe alloy. Therefore, a solution which can remove the silicon dioxide matrix without etching the main pole and side gap material would be very beneficial to the art.

SUMMARY

A magnetic head according to one embodiment includes a side gap layer comprising primarily silicon nitride, wherein outer sides of the side gap layer taper away from one another from a leading end of the side gap layer towards a trailing end of the side gap layer; a seed layer above the silicon nitride side gap layer; and a magnetic pole on the seed layer.

A magnetic head according to another embodiment includes an etch stop layer; a side gap layer comprising primarily silicon nitride above the etch stop layer, wherein outer sides of the side gap layer taper away from one another from a leading end of the side gap layer towards a trailing end of the side gap layer, wherein a cross sectional thickness of the side gap layer in a direction perpendicular to an inner side wall of the side gap layer is about the same at all points along the inner side wall; a seed layer above the silicon nitride side gap layer; an electroplated magnetic pole on the seed layer; a trailing gap layer formed above a trailing edge side of the main magnetic pole; and a wrap around shield adjacent the outer sides of the side gap layer.

A method for forming a magnetic head according to one embodiment includes etching a channel in a silicon oxide layer; forming a side gap layer comprising primarily silicon nitride in the channel; forming a seed layer above the side gap layer; plating a pole on the seed layer; and removing the silicon oxide layer by wet etching.

Any of these embodiments may be implemented in the production of a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein.

Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a magnetic head includes a side gap layer comprising primarily silicon nitride, wherein outer sides of the side gap layer taper away from one another from a leading end of the side gap layer towards a trailing end of the side gap layer; a seed layer above the silicon nitride side gap layer; and a magnetic pole on the seed layer.

In another general embodiment, a magnetic head includes an etch stop layer; a side gap layer comprising primarily silicon nitride above the etch stop layer, wherein outer sides of the side gap layer taper away from one another from a leading end of the side gap layer towards a trailing end of the side gap layer, wherein a cross sectional thickness of the side gap layer in a direction perpendicular to an inner side wall of the side gap layer is about the same at all points along the inner side wall; a seed layer above the silicon nitride side gap layer; an electroplated magnetic pole on the seed layer; a trailing gap layer formed above a trailing edge side of the main magnetic pole; and a wrap around shield adjacent the outer sides of the side gap layer.

In yet another general embodiment, a method for forming a magnetic head includes etching a channel in a silicon oxide layer; forming a side gap layer comprising primarily silicon nitride in the channel; forming a seed layer above the side gap layer; plating a pole on the seed layer; and removing the silicon oxide layer by wet etching.

According to one embodiment, a solution, which may be used in a wet etch of silicon dioxide, with the proviso that HF is not used in the solution, may include a strong base at very high temperatures, e.g., NaOH, KOH, etc. The advantage of these very high pH solutions is prevention of the corrosion of CoNiFe alloys, and that the solutions cannot form any water soluble compounds at these high pH's, and therefore do not corrode even in contact with a noble seed layer, such as Ru, that would normally induce galvanic corrosion of the main pole in water.

In another embodiment, the alumina side gap used in conventional magnetic heads is replaced by a silicon nitride side gap that does not dissolve in high pH solutions, the solutions being used to wet etch silicon dioxide. In a 35% NaOH solution at about 90° C., the rate of dissolution of silicon dioxide is about 1710 nm/hr, (285 Å/min), and the rate of silicon nitride dissolution is negligible after about 10 minutes in solution. Silicon nitride maintains the main pole integrity and using a very high pH solution also prevents corrosion of the main pole significantly, according to various embodiments. In addition, the enormous wet etch selectivity difference between silicon nitride and silicon dioxide in high pH/high temperature solutions makes silicon nitride an ideal or nearly ideal etch stopping layer for performing silicon dioxide wet etches.

The problem with using a very high pH (NaOH, KOH) solution to wet etch silicon dioxide is that these solutions readily etch alumina also. This means that any side gap deposited before the silicon dioxide layer will be dissolved in a process which uses a very high pH solution.

Figure 1:
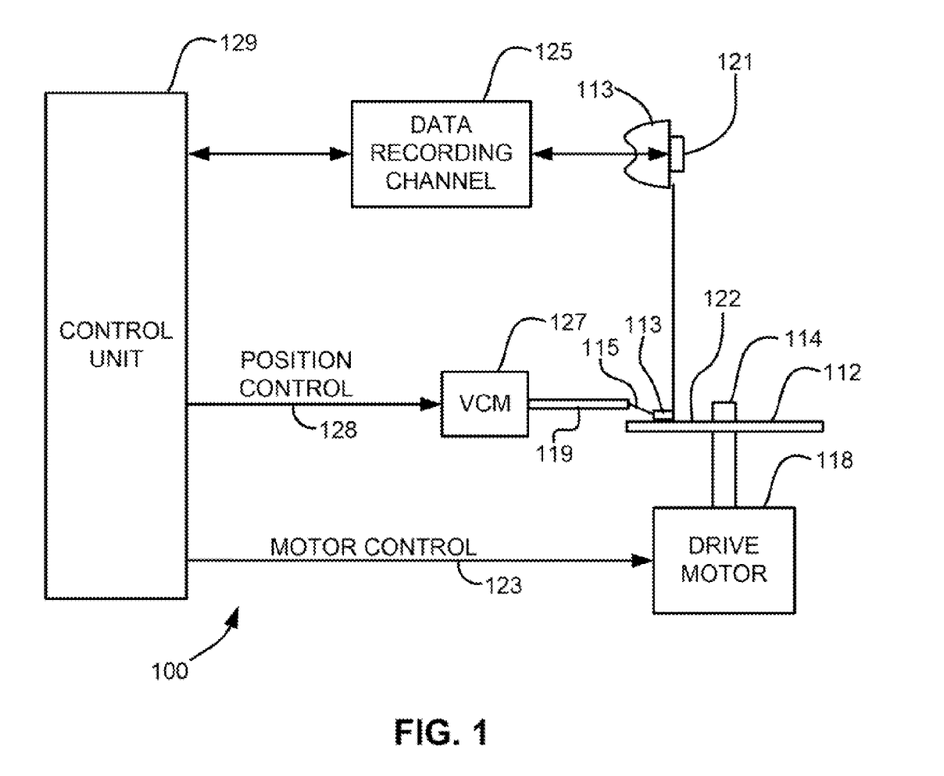
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider 113. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figures 2A, 2C:
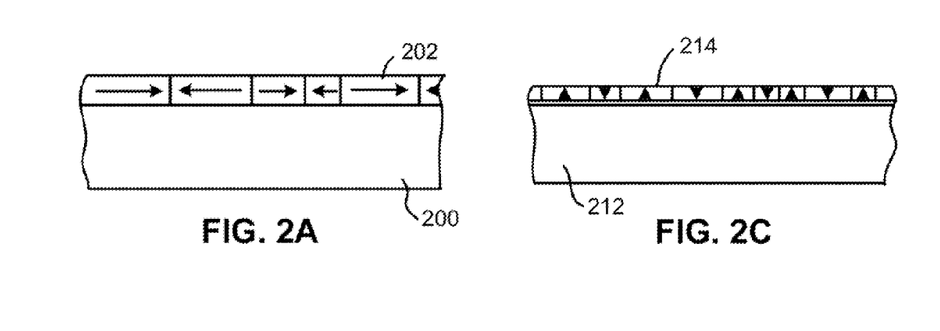
FIG. 2A is a schematic representation in section of a recording medium utilizing a longitudinal recording format.
FIG. 2C is a magnetic recording medium utilizing a perpendicular recording format.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

Figure 2B:
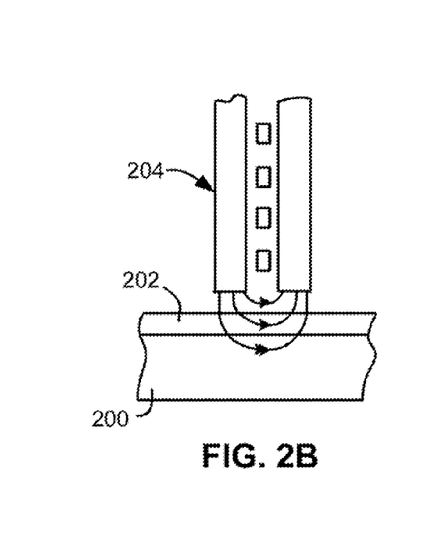
FIG. 2B is a schematic representation of a conventional magnetic recording head and recording medium combination for longitudinal recording as in FIG. 2A.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

Figure 2D:
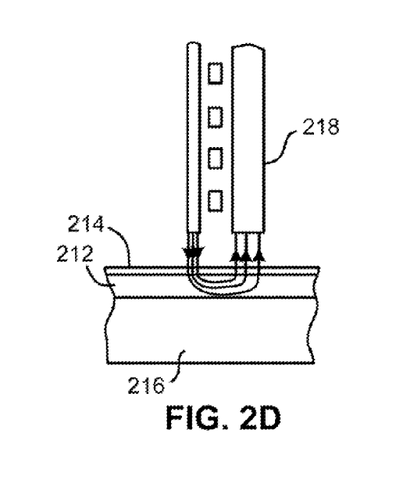
FIG. 2D is a schematic representation of a recording head and recording medium combination for perpendicular recording on one side.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

Figure 2E:
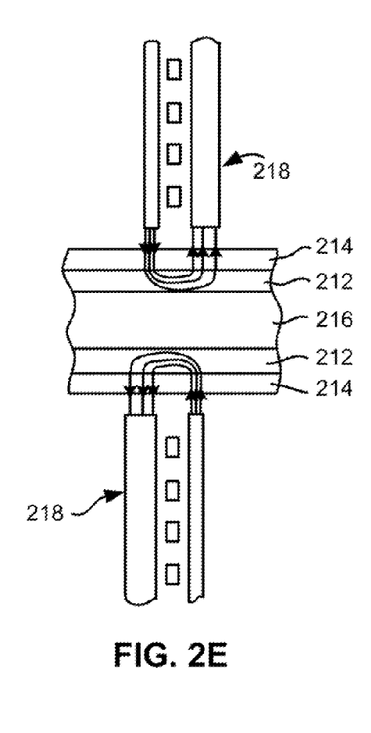
FIG. 2E is a schematic representation of a recording apparatus adapted for recording separately on both sides of the medium.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3A:
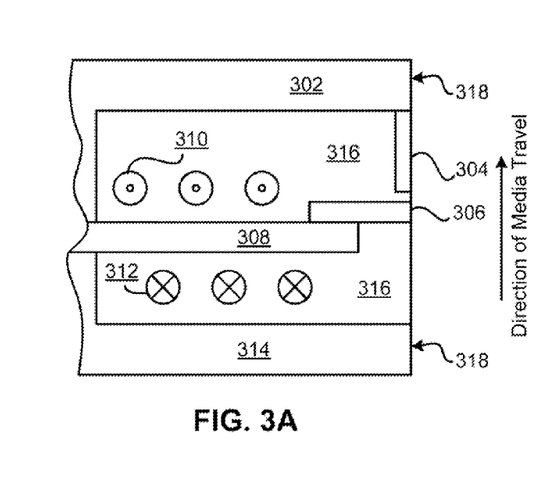
FIG. 3A is a cross-sectional view of one particular embodiment of a perpendicular magnetic head with helical coils.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

Figure 3B:
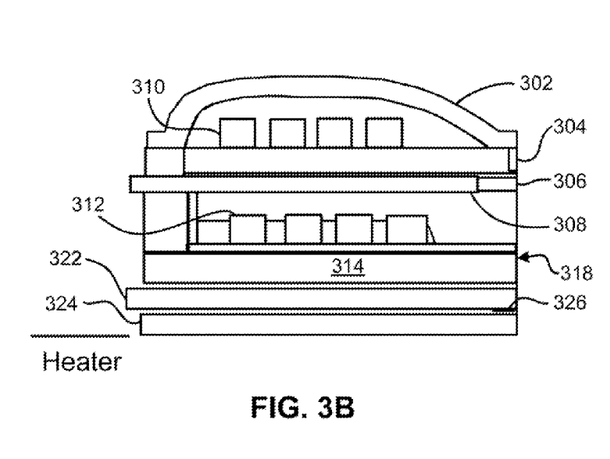
FIG. 3B is a cross-sectional view of one particular embodiment of a piggyback magnetic head with helical coils.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

Figure 4A:
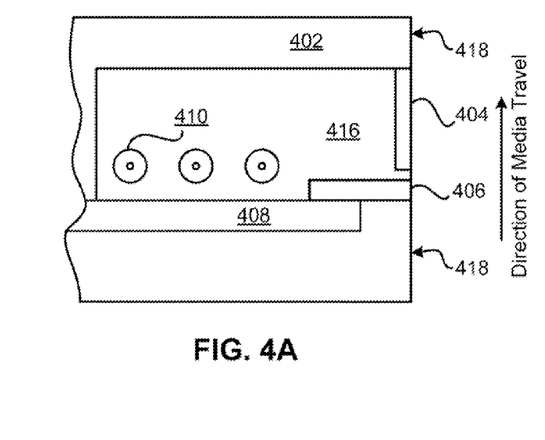
FIG. 4A is a cross-sectional view of one particular embodiment of a perpendicular magnetic head with looped coils.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

Figure 4B:
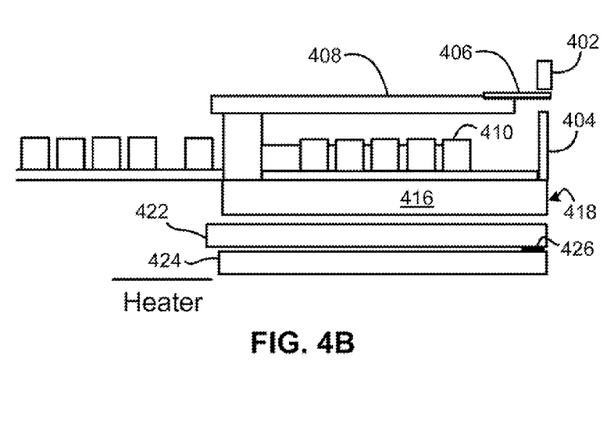
FIG. 4B is a cross-sectional view of one particular embodiment of a piggyback magnetic head with looped coils.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

According to one embodiment, a magnetic head pole and surrounding structure includes a side gap layer comprising primarily silicon nitride with optional or parasitic materials, where "comprising primarily" means having at least 90 at % of the main component (e.g., SiN), more preferably at least 95 at % and ideally as close to 100 at % of the main component as possible. Outer sides of the side gap layer taper away from one another from a leading end of the side gap layer towards a trailing end of the side gap layer, giving the outer sides a V-like shape. A seed layer is formed above the silicon nitride side gap layer, and a magnetic pole is formed on the seed layer.

To exemplify the structure, the following illustrative method of manufacture sets forth various aspects and embodiments of the novel structure. The method and concepts may be used in conjunction with any type of magnetic head, including those set forth above in relation to FIGS. 1-4B. Also, while various layers are discussed, it should be noted that additional and/or other layers may be added, used and/or removed in the various permutations of the present invention. Moreover, particular dimensions may be provided, and this has been done by way of example only, and a given implementation may use dimensions larger or smaller than those described in the example.

Figure 5:
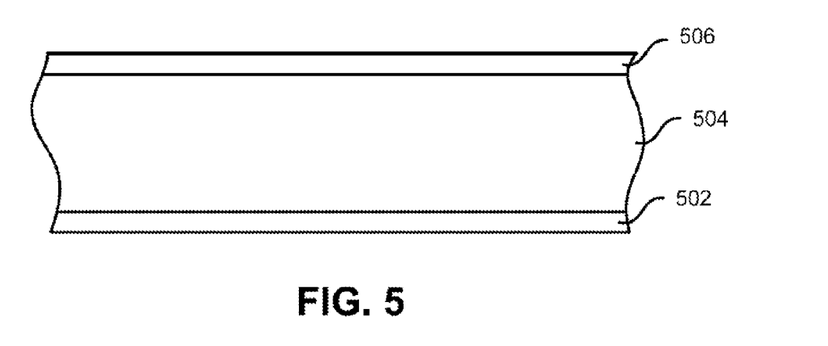
FIGS. 5-14 are partial cross-sectional views illustrating formation of a magnetic head, according to one embodiment.

Referring to FIG. 5, an etch stop layer 502 is formed above a substrate (not shown), which may include previously formed layers and devices. The etch stop layer may be formed of any suitable material, such as Cr, NiCr, NiFe, etc.

A silicon oxide layer 504, i.e. comprising primarily a silicon oxide such as silicon dioxide, is formed above the etch stop layer, and in some approaches directly thereon.

A mask layer 506 is formed above the silicon oxide layer. The mask layer is preferably etch resistant, and may be formed of any suitable material, such as Cr, NiCr, NiFe, etc.

Figure 6:
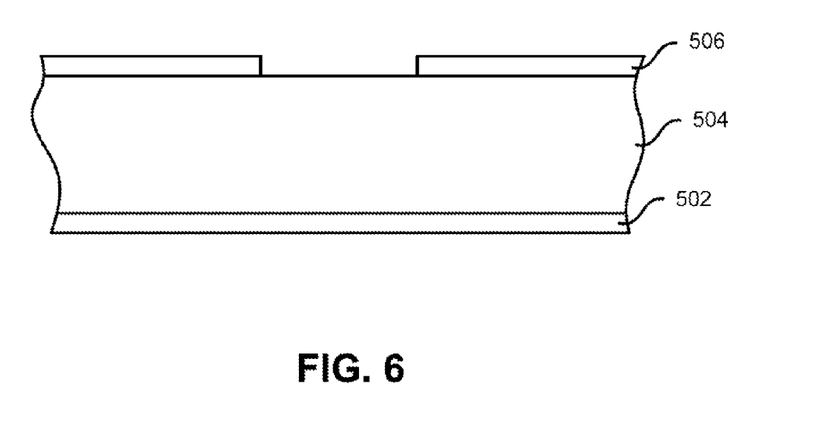

Referring to FIG. 6, the mask layer is patterned using conventional techniques such as milling, wet etching, laser ablation, etc., thereby exposing a portion of the silicon oxide layer.

Figure 7:
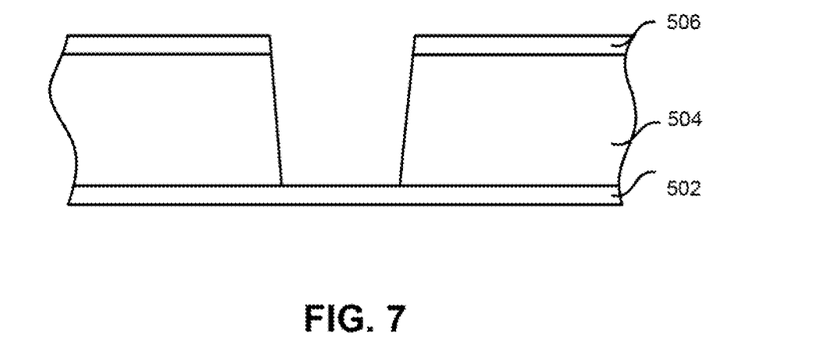

Referring to FIG. 7, a channel is etched in the silicon oxide layer, as defined by the mask layer. Reactive ion etching may be used to create the channel.

Figure 8:
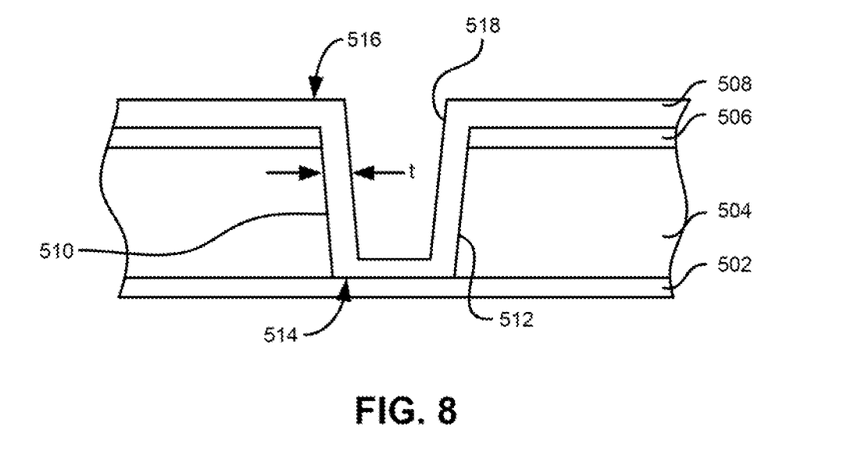

Thereafter, as shown in FIG. 8, a side gap layer 508 comprising primarily silicon nitride is deposited in the channel. Any suitable method for applying this type of material may be used. As shown, outer side walls 510, 512 of the side gap layer may taper away from one another from a leading end 514 of the side gap layer towards a trailing end 516 of the side gap layer. Conformal deposition techniques are preferred. Particularly preferred is atomic layer deposition (ALD) due to its conformal deposition characteristics. Using ALD or other conformal technique, a cross sectional thickness, t, of the side gap layer in a direction perpendicular to an inner side wall 518 of the side gap layer is about the same at all points along the inner side wall, which would encompass any variation in thickness at transition points such as a corner. Because the side gap layer will provide the gap between the pole and the wrap around shield in some embodiments, a uniform deposition thickness is desirable. An illustrative thickness of the side gap layer is about 10 nm to about 80 nm, where "about X" may mean X±10%.

An optional adhesion layer may be formed above the side gap layer using any suitable technique, such as sputtering, ALD, etc. The adhesion layer may include any suitable material known in the art. The adhesion layer may be used to promote adhesion of subsequent layers to the side gap layer.

Figure 9:
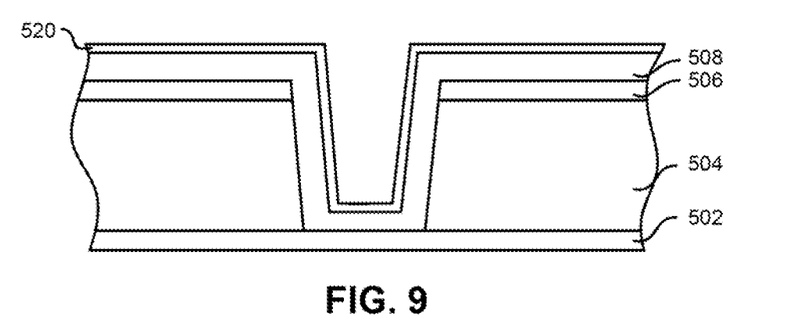

Referring to FIG. 9, a plating seed layer 520 is formed above the side gap layer using any suitable technique, such as sputtering, ALD, etc. The seed layer composition may include a magnetic material, but need not. Illustrative materials include Ru, Au, Fe, NiFe, CoFe, etc.

Figure 10:
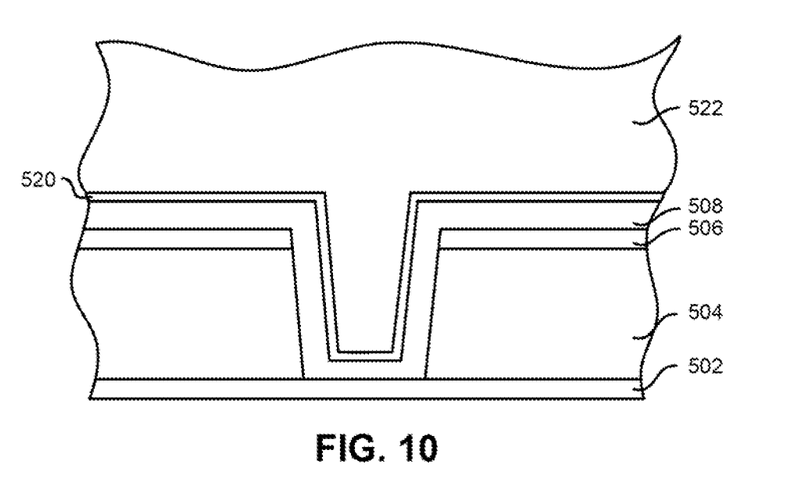

As shown in FIG. 10, a magnetic pole 522 is plated on the seed layer using conventional techniques and/or materials. The pole may be the main pole of a magnetic head, such as one of the heads described above.

Figure 11:
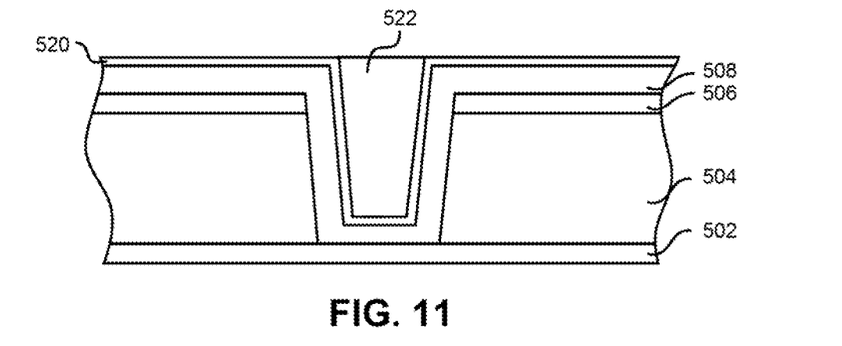

Referring to FIG. 11, an optional planarization step, e.g., using chemical mechanical polishing (CMP) may be performed to planarize the structure. Note that if a noble metal such as Ru is used as the seed layer, it may act as a polishing stop layer.

Figure 12:
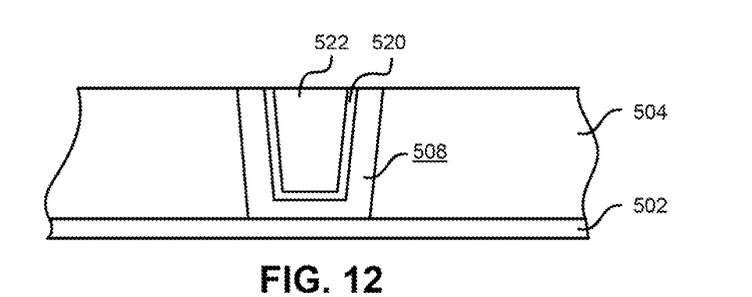

Referring to FIG. 12, further removal techniques such as milling, etc. may be used to expose the silicon oxide layer. Preferably, the structure is slightly overmilled to ensure the silicon oxide layer is fully exposed.

Figure 13:
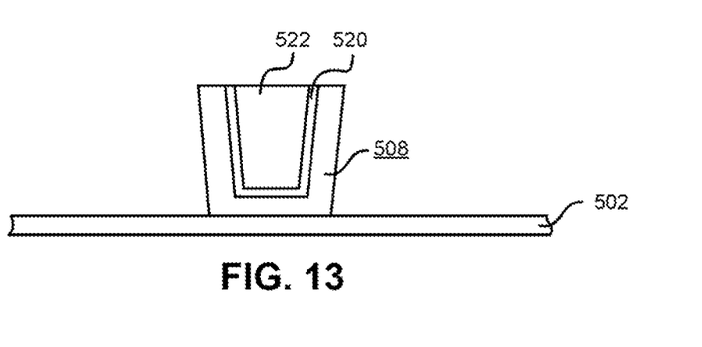

Referring to FIG. 13, the silicon oxide layer is removed by wet etching. Wet etching is very isotropic, so the silicon oxide layer can be completely removed, even in a design having a reentrant angle between the plane of the substrate and sidewall of the side gap layer. Thus, in some approaches, no silicon oxide is present adjacent the sidewalls of the side gap layer adjacent the leading edge 514 of the side gap layer after the wet etching.

During the wet etching step, the structure may be submersed in a hydroxide solution that selectively removes the silicon oxide layer faster than the side gap layer. Any hydroxide may be used, including Group 1 and Group 2 hydroxides. Illustrative hydroxide solutions may include one or more of sodium hydroxide, potassium hydroxide, etc. Hydroxide solutions generally do not consume the pole.

In one approach, the wet etch solution may be an aqueous solution having at least 25 at % of the hydroxide component, e.g., 25 at % or more of sodium hydroxide, preferably at least 35 at %. Lower concentrations can also be used, but the rate of etching may be impractically slow. Moreover, concentrations up to and exceeding the maximum solubility of the hydroxide may be used.

The temperature of the wet etch is not critical, and generally can be conducted at temperatures of about 100 degrees C. or less, though some approaches could use higher temperatures. An illustrative temperature range is between about 60 and about 90 degrees C. Lower temps may also be used, where a slower etch rate is desired.

Figure 14:
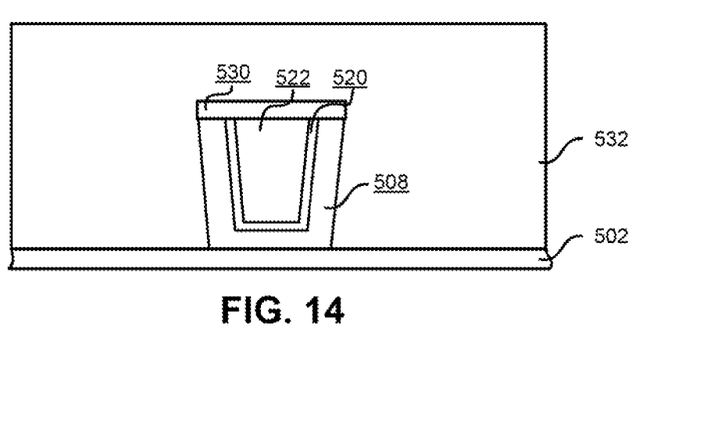

Further processing may be performed after removing the silicon oxide layer, such as forming a trailing gap layer 530, e.g., of silicon nitride, alumina, etc. above the trailing edge side of the main magnetic pole. Moreover, a wrap around shield 532 (and any seed layer) may be formed adjacent outer sides of the side gap layer. Intervening layers may be present between the side gap layer and the wrap around shield (or seed therefor), but ideally no silicon oxide is present therebetween.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
   a side gap layer comprising primarily silicon nitride, wherein outer sides of the side gap layer taper away from one another from a leading end of the side gap layer towards a trailing end of the side gap layer;
   a seed layer above the silicon nitride side gap layer;
   a magnetic pole on the seed layer; and
   a silicon nitride trailing gap layer formed above a trailing edge side of the main magnetic pole.

2. The magnetic head of claim 1, further comprising an adhesion layer between the side gap layer and the seed layer.

3. The magnetic head of claim 1. wherein the silicon nitride trailing gap layer comprises at least about 95% silicon nitride, and wherein outer sides of the side gap layer taper away from one another from a leading end of the side gap layer towards a trailing end of the side gap layer in a V-like shape.

4. The magnetic head of claim 1, wherein no silicon oxide is present adjacent the sidewalls of the side gap layer adjacent the leading end of the side gap layer.

5. The magnetic head of claim 1, further comprising an etch stop layer positioned under the side gap layer.

6. The magnetic head of claim 1, further comprising a wrap around shield adjacent the outer sides of the side gap layer.

7. A magnetic data storage system, comprising:
   a magnetic head as recited in claim 1;
   a drive mechanism for passing a magnetic medium over the magnetic head; and
   a controller electrically coupled to the magnetic head.

8. A method for forming the magnetic head of claim 1, the method comprising:

etching a channel in a silicon oxide layer;
forming the side gap layer comprising primarily silicon nitride in the channel;
forming the seed layer above the side gap layer;
plating the magnetic pole on the seed layer; and
removing the silicon oxide layer by wet etching.

9. The method of claim 8, further comprising forming an adhesion layer between the side gap layer and the seed layer.

10. The method of claim 8, further comprising forming the silicon nitride trailing gap layer above a trailing edge side of the main magnetic pole.

11. The method of claim 8, wherein no silicon oxide is present adjacent the sidewalls of the side gap layer adjacent a leading end of the side gap layer after the wet etching.

12. The method of claim 8, wherein the silicon oxide layer is formed above an etch stop layer.

13. The method of claim 8, further comprising forming a wrap around shield adjacent outer sides of the side gap layer after removing the silicon oxide layer.

14. A magnetic head, comprising:
an etch stop layer;
a side gap layer comprising primarily silicon nitride above the etch stop layer, wherein outer sides of the side gap layer taper away from one another from a leading end of the side gap layer towards a trailing end of the side gap layer, wherein a cross sectional thickness of the side gap layer in a direction perpendicular to an inner side wall of the side gap layer is about the same at all points along the inner side wall;
a seed layer above the silicon nitride side gap layer;
an electroplated magnetic pole on the seed layer;
a trailing gap layer formed above a trailing edge side of the main magnetic pole; and
a wrap around shield adjacent the outer sides of the side gap layer.

15. The magnetic head of claim 14, wherein no silicon oxide is present adjacent the sidewalls of the side gap layer adjacent the leading end of the side gap.

16. A magnetic data storage system, comprising:
a magnetic head as recited in claim 14;
a drive mechanism for passing a magnetic medium over the magnetic head; and
a controller electrically coupled to the magnetic head.

17. A magnetic head, comprising:
a side gap layer comprising primarily silicon nitride, wherein outer sides of the side gap layer taper away from one another from a leading end of the side gap layer towards a trailing end of the side gap layer;
a seed layer above the silicon nitride side gap layer;
an adhesion layer between the side gap layer and the seed layer;
a magnetic pole on the seed layer; and
a silicon nitride trailing gap layer formed above a trailing edge side of the main magnetic pole.

18. A magnetic data storage system, comprising:
a magnetic head as recited in claim 17;
a drive mechanism for passing a magnetic medium over the magnetic head; and
a controller electrically coupled to the magnetic head.

19. The magnetic head of claim 17, wherein no silicon oxide is present adjacent the sidewalls of the side gap layer adjacent the leading end of the side gap.

* * * * *